United States Patent [19]
Failing et al.

[11] Patent Number: 5,241,467
[45] Date of Patent: Aug. 31, 1993

[54] SPACE MANAGEMENT SYSTEM

[75] Inventors: Bruce F. Failing, Greenwich; Anthony P. Fernandez, Ridgefield; George T. Briechle, New Canaan; Edward J. Fenwick, Redding; J. Robert Venable, Darien, all of Conn.

[73] Assignee: ERS Associates Limited Partnership, Wilton, Conn.

[21] Appl. No.: 876,198

[22] Filed: Apr. 30, 1992

[51] Int. Cl.⁵ .............................................. G06F 15/24
[52] U.S. Cl. .................................. 364/401; 364/403; 235/383
[58] Field of Search .................. 364/401, 403, 464.01; 235/375, 383; 340/825.35

[56] References Cited

U.S. PATENT DOCUMENTS

| | | | |
|---|---|---|---|
| 4,636,950 | 1/1987 | Caswell et al. | 364/403 |
| 4,783,740 | 11/1988 | Ishizawa et al. | 364/403 |
| 4,796,209 | 1/1989 | Burk | 364/403 |
| 5,005,125 | 4/1991 | Farrar et al. | 364/403 |
| 5,172,314 | 12/1992 | Poland et al. | 364/401 |

Primary Examiner—Roy N. Envall, Jr.
Assistant Examiner—Jennifer L. Hazard
Attorney, Agent, or Firm—Brumbaugh, Graves, Donohue & Raymond

[57] ABSTRACT

An improved system for space management in retail stores is described. The space management system includes price display labels mounted on rails along the edges of shelves in a store. A communications link between the computer and the labels permits the computer to address each label by a logical address and to determine the physical location of each label to within a resolution of typically four feet. The system prepares price audit lists and adjacency audit lists that permit economical use of the time of store personnel during the audit. The lists are generated in such a way that the items on a particular list are physically contiguous; thus once the correct general area has been located by the auditor little additional time need be spent locating the individual items. In performing an audit of product facings, the user is able to use the display hardware, including the pushbutton on each label, as a data collection system for product facing information. In product location mode, the user starts at the first label at one end of a shelf and presses the button on the first label. The user moves to the second label, presses its button, moves to the third label, and the process is repeated for each label along the shelf, and for the rest of the shelves in the area being audited. This permits the system to collect information as to the sequence of labels along a rail.

19 Claims, 5 Drawing Sheets

SPACE MANAGEMENT SYSTEM

BACKGROUND OF THE INVENTION

The invention relates generally to systems for maintaining price and inventory information regarding merchandise in a retail store, and relates particularly to systems for engaging the space in the store to optimize several aspects of operation, including verification of item locations, confirmation of item adjacency relationships, and auditing of prices and product facings.

A number of factors have made retail store management more difficult in recent times, including narrowing profit increasing expenses, increasing labor costs, unavailability of desired education and skill levels in employees, and the proliferation of retail brands and products within brands. Due to these and other factors, those managing retail stores, particularly grocery stores, have given much attention in recent years both to reducing the cost of fulfilling existing store practices, and to developing new store practices.

One known store practice is the "price audit". In the simplest case, a store that practices manual price auditing will have a list of expected prices, and on a particular day a store employee will be given a portion of the list. The employee is instructed to locate each item from the list in its actual store location, where the price will be checked. In a store where prices are marked on the goods, the marked prices are compared with the price on the list. In a store where prices are posted or displayed nearby to the goods, the posted or displayed price is compared with the list price. Despite the great labor cost involved, management at most large grocery chains will choose to perform manual price auditing on a more or less continuous basis. The management goal is typically that every price will have been audited at least as often as, say, once per year.

For many reasons, manual price auditing is less than perfect. It sometimes happens that a product is displayed in multiple store locations, for example, yet the person performing the audit will not necessarily know to continue searching after one occurrence of an item has been found. Thus, second or third locations of an item may miss having the price audited. Also, on a given day the employee performing price auditing will have a list of items to check, and the sequence of items on the list will typically not match the physical arrangement of items on display, so that each item on the list requires a search for the physical item in the store.

Another known store practice is the establishment of plan-o-grams. In a store that has established plan-o-grams, every section of shelving is memorialized, typically in pictorial form, regarding placement of each item of merchandise. Theoretically, nothing is left to chance in a store that has established plan-o-grams; there is a place for everything and everything is in its place.

As a practical matter, it is a ponderous task to establish plan-o-grams for a chain of retail stores. Each new product announcement by a manufacturer represents the prospect of having to update or change the plan-o-grams, as does the discontinuance of a product. At the level of an individual store, it is very easy for the physical store layout to deviate from the arrangement set forth in the plan-o-grams, whether due to inadvertence or otherwise. Furthermore, while most stocking is performed by store employees, some lines of goods are traditionally stocked by representatives of the manufacturers, who have a natural incentive to stock goods in such a way as to promote sales of the goods of their employers. One variable that stores attempt to control is the number of "facings" of each product. A particular manufacturer would prefer, of course, that its products each enjoy a large number of facings, and that the products of its competitors have very few facings. Another variable is the shelf location. Every manufacturer would prefer that its goods be at eye level, yet not all the store shelves are at eye level. Yet another variable to be controlled is the adjacency of particular pairs of products or of product categories.

While the particular locations, facings, and adjacencies of goods within a store are all important, it is of even greater importance that store management be capable of ensuring that the store at least contains the goods that are desired to be present in the store. To that end, management will often maintain a "shelf set", a list of items that are expected or desired to be found in each store. While a manual audit could be performed to confirm that each item on the shelf set list is in a store, it is desirable that store management be able to identify exceptions in a routine, non-labor-intensive, automated way.

In addition to the identities of items of merchandise, the shelf set may also include information as to the desired number of facings for each item. It is very labor-intensive to confirm manually that for each item in a store, the actual number of facings matches the desired number. Thus it is highly desirable to provide an automated or nearly automated way to determine the extent to which actual facings correspond to desired facings.

SUMMARY OF THE INVENTION

In accordance with the invention, there is provided an improved system for space management in retail stores. The space management system includes electronic price display labels mounted on rails along the edges of shelves in a store. A store computer in the store communicates with the labels by an asynchronous serial data link. The communications link between the computer and the labels permits the computer to address each label by a logical address and to determine the physical location of each label to within a resolution of typically four feet.

In the improved space management system according to the invention, price audit lists are prepared that permit economical use of the time of store personnel during the audit. The lists are generated in such a way that the items on a particular list are physically contiguous; thus once the correct general area has been located by the auditor little additional time need be spent locating the individual items. Store management are able to predetermine the criteria according to which audit lists are prepared, and can adjust the criteria over time.

In the improved space management system according to the invention, adjacency audit lists may also be prepared. In each entry of such a list, the entry will communicate that it is desired for two particular items to be adjacent in store shelf display. The auditor is expected to locate the two items and to confirm that they are physically adjacent.

In each of these audit processes, the auditor reports the exceptions that were found; theoretically there would never be exceptions and in actuality it is hoped there are very few exceptions. In the space management system according to the invention the auditor is able to provide the exceptions by a streamlined data input procedure; if performed at a keyboard, the number of required keystrokes is kept to a minimum.

In the improved space management system according to the invention, the tedious task of auditing product facings is made much easier, and the danger that exceptions might be overlooked is minimized. In performing an audit of product facings, the user is able to use the display hardware, i.e. the electronic price label, including the pushbutton on each label, as a data collection system for product facing information. This eliminates the multiplicity of manual writing, copying, and keying steps in prior art ways of auditing product facings. The user signals to the system the portion of the store in which auditing is to take place, and the labels in that portion of the store change from the normal price display mode to a facing audit mode. In facing audit mode, the user starts at the first label at one end of a shelf and notes the actual number of product facings corresponding to that label. The user then presses the pushbutton on the label repeatedly—once for each observed product facing. The process is repeated for each label along the shelf, and for the rest of the shelves in the area being audited.

In the improved space management system according to the invention, it is a straightforward matter to collect reliable information about the actual sequence of products on shelves. This information is important to the plan-o-gram audit activity mentioned above. The user signals to the system the portion of the store in which the collection of location information is to take place, and the labels in that portion of the store change from the normal price display mode to a product location mode. In product location mode, the user starts at the first label at one end of a shelf and presses the button on the first label. The user moves to the second label, presses its button, moves to the third label, and the process is repeated for each label along the shelf, and for the rest of the shelves in the area being audited. This permits the system to collect information as to the sequence of labels along a rail.

BRIEF DESCRIPTION OF THE DRAWING

The invention, will be described with respect to the drawings, of which.

Like items are, where possible, shown in the various figures with like reference numerals.

DETAILED DESCRIPTION

Figure 1:
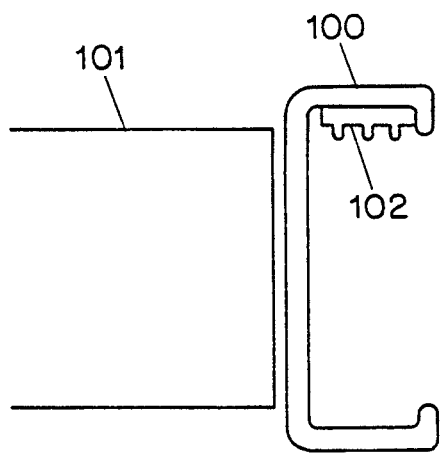
FIG. 1 shows a cross section of a typical rail in the space management system.
Figure 2:
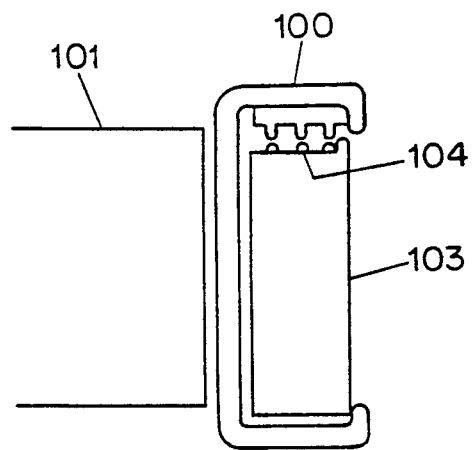
FIG. 2 shows the rail cross section of FIG. 1 together with a cross section of a label mechanically and electrically engaged therewith.

The backbone of the space management system is the rail mounted at the aisle edge of a shelf. In FIG. 1 the rail 100 appears in cross section, attached to a shelf 101 of the store. Rail has electrical contacts 102 along its length. The rail 100 is preferably of extruded aluminum and the contact assembly providing contacts 102 may be an etched fiberglass circuit board or a plastic strip with copper wires secured by interference fit into slots in the strip. FIG. 2 shows in cross section the structure of FIG. 1 together with a label 103. Contacts 104 of the label 103 provide electrical connection between the rail 100 and label 103, and the respective shapes of the rail 100 and label 103 provide a secure mechanical connection therebetween. Although an electrical intercommunication is shown, inductive or capacitive linkage could likewise be employed, as could radio frequency (RF) linkage or infrared or visible light modulation or any other communications medium with the rest of the space management system.

Figure 3:
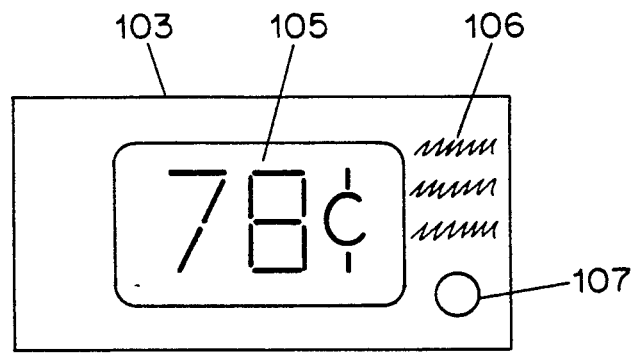
FIG. 3 shows a front view of a label.

FIG. 3 is a front view of a typical label 103. A display 105, preferably using liquid crystal technology, permits display of the price of a store product. Printed information 106 on the face of the label identifies the particular product with which the label 103 is associated. The printed information 106 is preferably provided by a laser-printed die-cut adhesive sticker applied to the face of the label 103. Such stickers are preferably printed on a laser printer linked to a store computer as described below. A button 107 may be pressed by a user. When the label 103 is in normal (price display) mode, pressing the button preferably causes the display to change to show unit pricing. As described below, the button 107 also supports a number of space management capabilities according to the invention.

Figure 7:
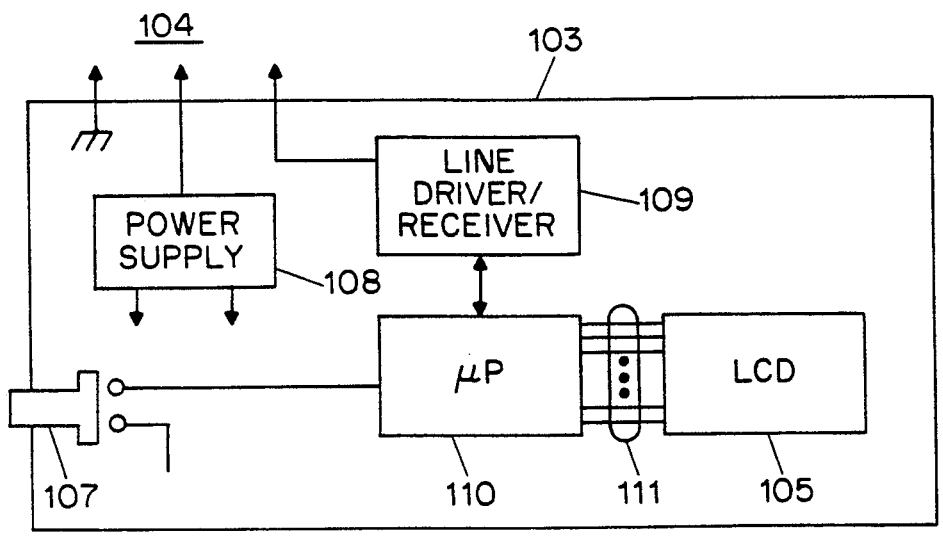
FIG. 7 shows in schematic form the circuitry of a typical label 103.

Turning now to FIG. 7, there is shown in schematic form the circuitry of the label 103. Power supply 108 receives power from one of the contacts 104, which is provided to the processor 110 and to other parts of the label. A line driver and receiver 109, also called an interface, is connected to another of the contacts 104. Preferably the receiver circuitry is disposed to detect the start bit of a serial data stream received from outside the label 103, and to provide an interrupt to the processor 110. In response to the interrupt, the processor 110 receives the remainder of the data stream via the receiver circuitry. The processor 110 may respond by causing the line driver to send a serial data stream to other equipment. The processor preferably also has LCD driver circuitry to drive display 105 by contacts 111 as shown. Pushbutton 107 provides an input to the processor 110. The processor 110 may have a nonvolatile memory, or an optional external EEPROM (not shown in FIG. 7) may be provided. Stored in the memory of the processor 110 or in the optional EEPROM is a (preferably unique) logical address for the label.

Figure 4:
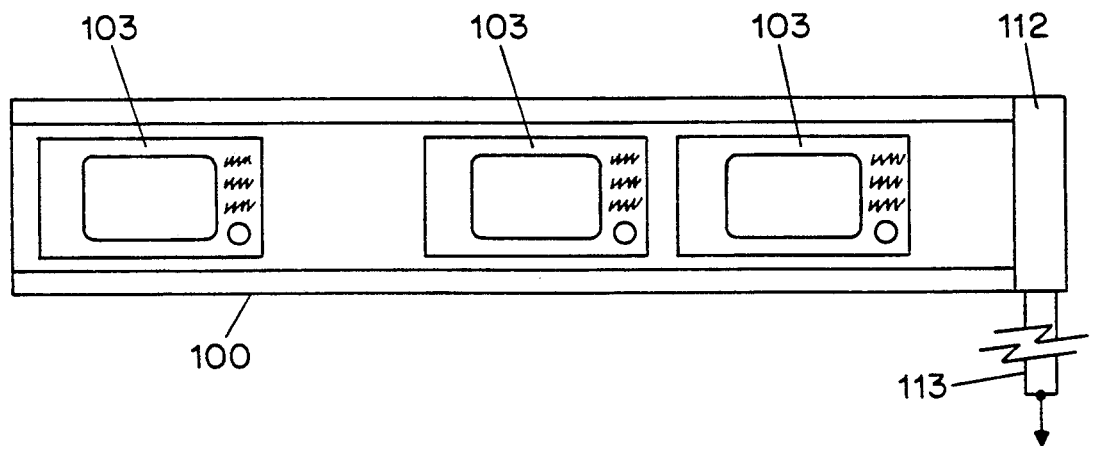
FIG. 4 shows a front view of a rail such as that of FIG. 1, together with a number of labels, and a cable running from the rail to the rest of the space management system.

Turning now to FIG. 4 there is shown a rail 100 in front view, as it would appear to a customer in a store when looking at a shelf 101 (not shown in FIG. 4). Mechanically secured to the rail 100 are a plurality of labels 103 as shown. Preferably the substantially constant cross-section design of the rail 100 is such that each label 103 may be placed at any of a large number of locations along the rail 100. End cap 112 provides a connection between the contacts 102 (not shown in FIG. 4) and a line 113 leading to the rest of the space management system. End cap 112 preferably also contains circuitry (not shown in FIG. 4) permitting a store computer to identify the particular rail from which a particular label 103 is sending a message, as described in more detail below. Preferably, the end cap circuitry appends a message to each response from a label 103 to the computer 115, the appended message containing the unique address of the particular end cap 112. The appended message locates the responding label 103 to within the length of the rail 100 of the end cap 112.

Figure 5:
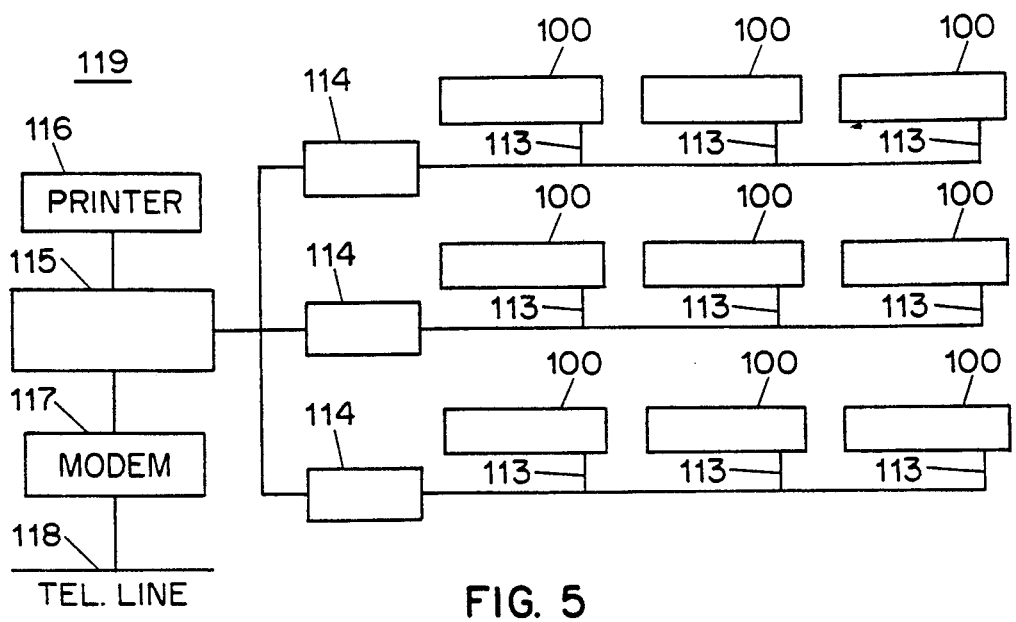
FIG. 5 shows a portion of the space management system, including a multiplicity of rails, a plurality of gondola controllers electrically coupled with the rails, and a store computer in communication with the gondola controllers.

FIG. 5 shows the space management system apparatus 119 for a store. Store computer 115 communicates with gondola controllers 114, by metallic conductive link or by RF link. Each gondola controller 114 is communicatively coupled via lines 113 to respective rails 100, and thence to the multiplicity of labels 103 (not shown in FIG. 5). The store computer 115 can generate messages which are broadcast to the labels 103, and the response of a particular label 103 may be received by the store computer 115. Store computer 115 is preferably connected with a laser printer 116, which among other things is used to print the above-mentioned stickers to provide the printed information 106 a described above in connection with FIG. 3. Store computer 115 is also coupled to store management, preferably by modem 117 connected to telephone line 118.

Figure 6:
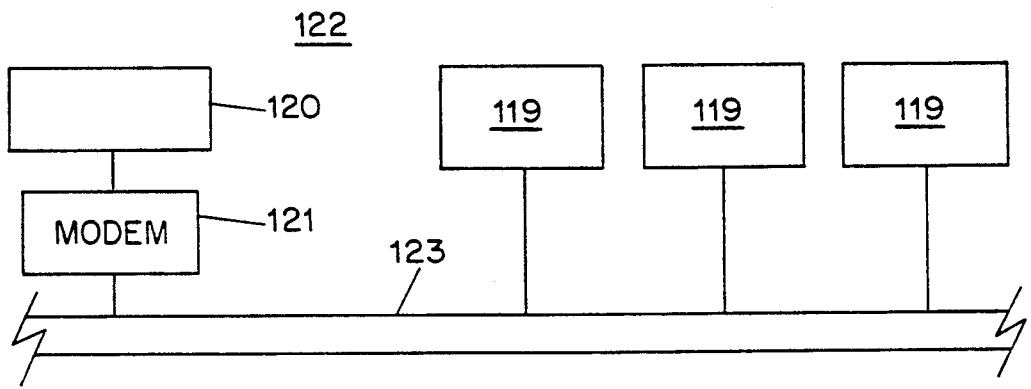
FIG. 6 shows the space management system, including a management computer system and a plurality of store installations.

As shown in FIG. 6, space management system 122 includes management computer 120 and a plurality of store space management apparatus 119. The management computer 120 and store space management apparatus 119 are communicatively coupled, preferably via modem 121 and public switched telephone network 123. Alternatively, management computer 120 and store space management apparatus 119 could be communicatively coupled through a virtual private data network, via a switched data network, or by other means, all without departing from the scope of the invention.

In the space management system according to the invention, protocols are defined whereby the store computer 115 may broadcast any of a number of predefined messages to the multiplicity of labels 103. Each message includes the address of the label 103 to which it is directed along with data, and each label 103 inspects each message to see whether the address in the message matches its own stored address. The most frequently occurring result for any particular label 103 is, of course, the absence of a match. If the address matches, however, then the remainder of the message is interpreted and acted upon by the label 103. Within the protocol definitions is a response by the label 103 back to the store computer 115.

It will be appreciated by those skilled in the art that the store space management system apparatus 119 may be subdivided into regions, each associated with a gondola controller 114 as shown in FIG. 5. Without departing in any way from the present invention, the task of generating and receiving messages on the rails may be largely delegated to the gondola controllers 114, thus increasing the effective bandwidth of the system apparatus 119.

Preferably the protocol definitions are such that it is also possible for the store computer 115 (or as mentioned above, for a gondola controller 114) to emit a "global" message—one not addressed to any particular label 103. One globally addressed message may ask whether a label 103 has had its button 107 pressed. The programming of the labels 103 is such that only if a particular label 103 has had its button 107 pressed will the label 103 respond. Preferably the label 103 responds with a message indicative of the address of the label 103 and indicative of the number of times the button has been pressed. Preferably, the rate at which such global polling takes place is sufficiently high that the likelihood of a message collision (due to overlapping responses by two or more labels 103) is acceptably small. The gondola controllers 114 may assume responsibility for emitting such global queries, thus reducing the time demand on the store computer 115 and reducing the likelihood of a message collision.

Preferably circuitry is provided in the end caps 112 so that the store computer 115 may identify the particular rail 100 from which a label message is being received, as described in copending U.S. Pat. appl. No. 07/757,675 filed Sep. 10, 1991. By using such end cap circuitry the location of a particular label 103 may be determined to within the ends of a four-foot section of a particular rail 100.

Figure 8:
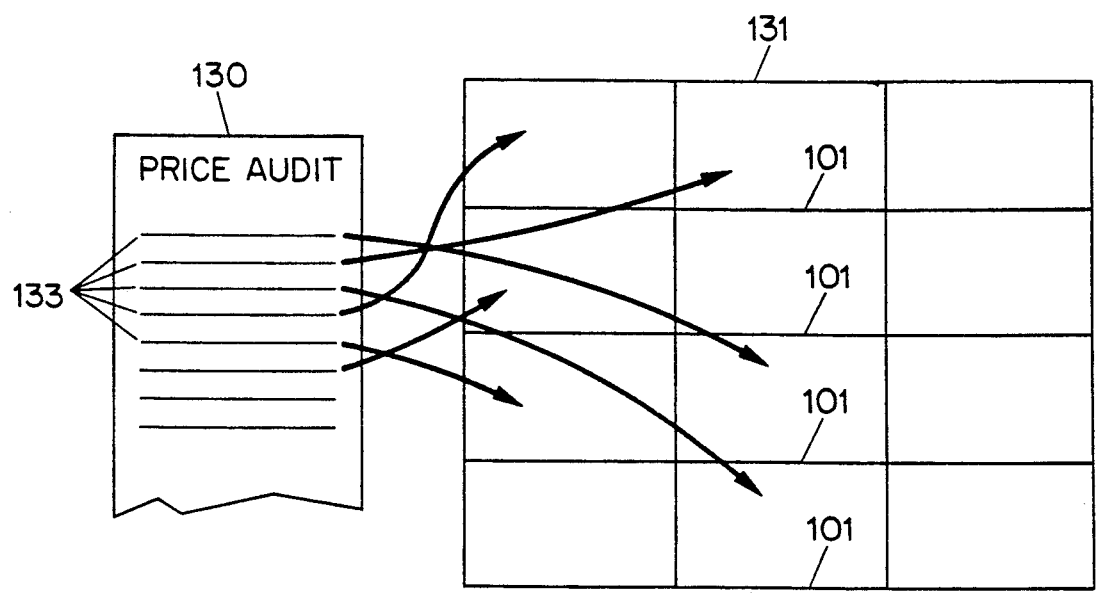
FIG. 8 shows a prior art price audit list in connection with a physical store layout.

As mentioned above, some prior art price audit lists have the problem in that the sequence of items on the list will typically not match the physical arrangement of items on display, so that each item on the list requires a search for the physical item in the store. This is shown diagrammatically in prior art FIG. 8, where a price audit list 130 is shown with list items 133. The person performing the price audit goes to store shelves 101 in gondola 131. The first of the items 133 must be located on the shelves 101, and the price display checked for agreement with the price on the list 130. The process is repeated for each of the list items 133. As will be appreciated by those skilled in the art, locating the items is time-consuming. In many prior art arrangements, the price audit list 130 narrows down the product locations at best to a department, for example "canned goods". It will also be appreciated that if a product is physically present at multiple store locations, it is possible that the second through n-th locations will not be checked. Finding one match on the shelves 101 will prompt the person performing the audit to check off the list item 133 and to proceed to the next item 133.

In the space management system according to the invention, the store computer 115 maintains several lists of information regarding the products and prices in the store.

Figure 10:
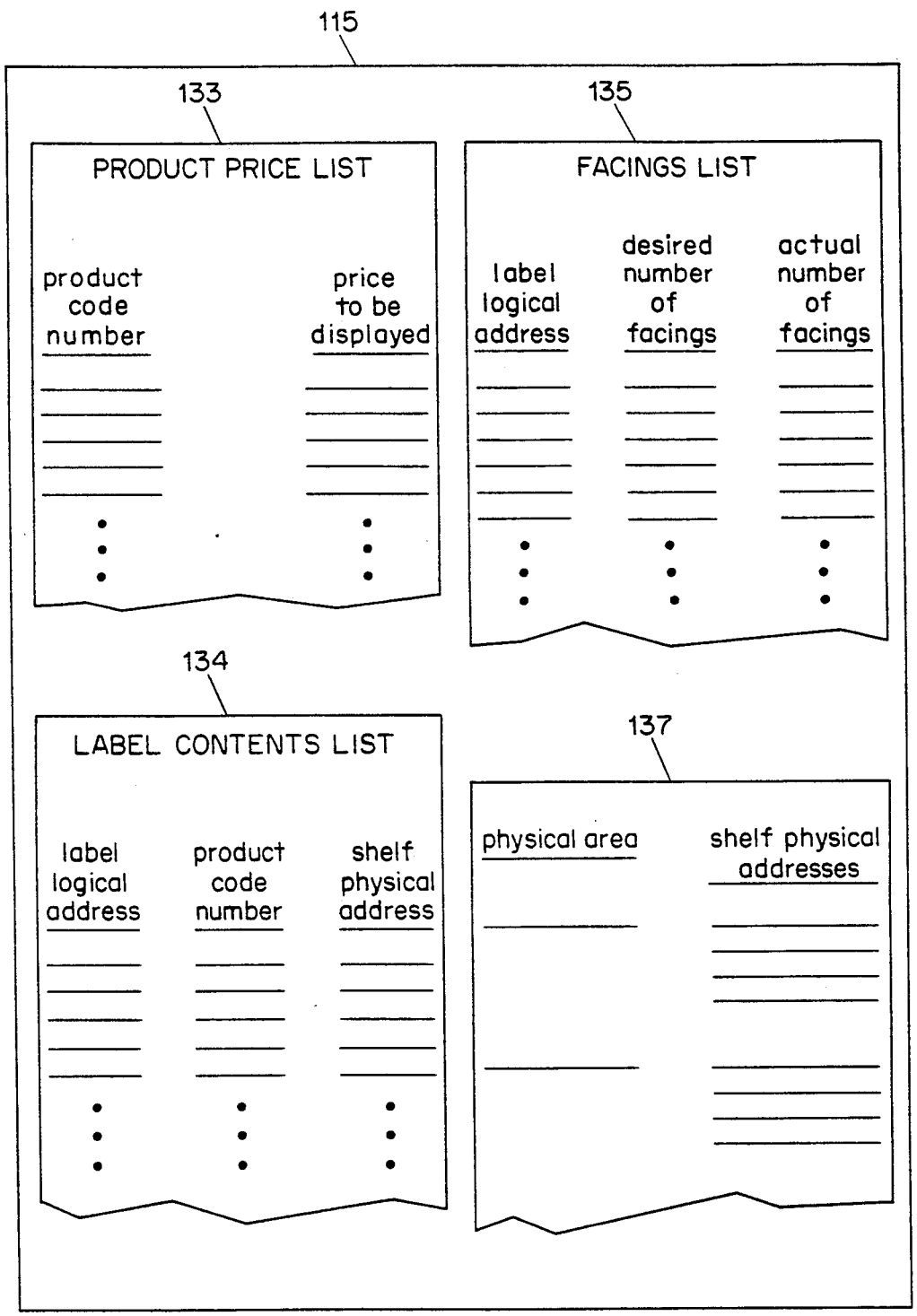
FIG. 10 shows some of the lists maintained typically within a store relating to product locations and prices.

As shown in FIG. 10, for a particular store a product price list 133 may have entries, one for each product in the store. The entry has a field listing a product code number (such as a Uniform Product Code) and the price that is to be displayed for that product. Although not shown in FIG. 10, it is preferable that numerous additional fields be provided, containing a plain-English description of the product, a stock number used by store management, the date and direction of the most recent price change for that product, and the desired amount in inventory.

Again with reference to FIG. 10, label contents list 134 may have entries, one for each physical label 103 in the store. (While most labels in the store are electronic price display labels, preferably some are cardboard, paper, or plastic labels, since not all store locations may easily accommodate an electronic price display label.) For each label entry in the list, there are fields giving the logical address of the label (i.e. the unique identifying number stored in the label in the case of an electronic label), the product code number associated with the label, and the shelf physical address associated with the label. The shelf physical address is determined, at least in part, by the above-mentioned method involving the circuitry in the end caps 112. More detailed shelf physical address information may also be derived from the button-pressing method described below. The list 134 may also be called a location storage, and may optionally also contain information regarding desired product adjacencies.

Also with reference to FIG. 10, a facings list 135 may have entries, one for each physical label 103 in the store. Fields store information as to the desired and actual number of product facings.

Those skilled in the art will appreciate that the list structures represented by lists 133 and 134 are merely exemplary, and that obvious variations are possible. For example, the two lists 133 and 134 could be combined as one by adding a "price to be displayed" to the list 134. The same may be said for lists 135 and 137, discussed below. The two lists 134 and 135 could be a single list, since they share a field for the label logical address. The lists could be maintained and linked according to store stock number rather than by product code number. Furthermore, although the lists 133, 134, 135, and 137 are here described as being maintained within store computer 115, the allocation of storage duties could be variously allocated between store computer 115 and gondola controllers 114, shown in FIG. 5.

Figure 9:
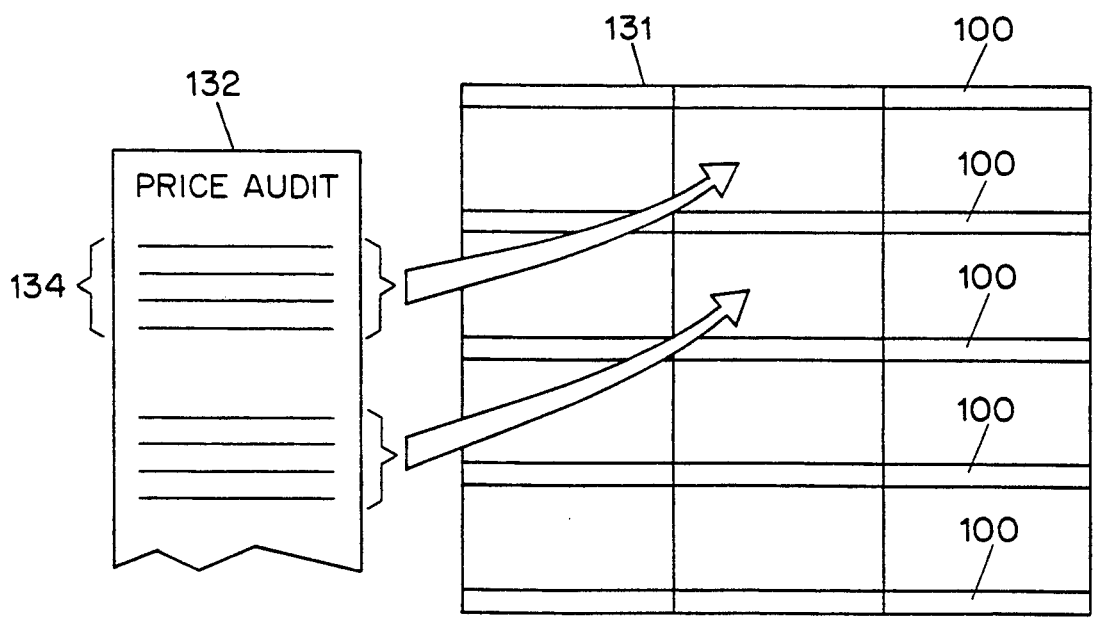
FIG. 9 shows a price audit list according to the invention, also in connection with a physical store layout.

As depicted in FIG. 9, in the improved space management system according to the invention, price audit lists 132 are prepared that permit economical use of the time of store personnel during the audit. The lists 132 are generated in such a way that the items on a particular list are physically contiguous; thus once the correct general area has been located by the auditor little additional time need be spent locating the individual items. With reference to FIG. 10, the system may select a particular shelf 100, then determine which items in list 134 are on that shelf 100. For those items, the price to be displayed is extracted from list 133. The plain-English description and the extracted price then are printed in the list 132, and the natural groupings 134 for items expected on a particular shelf 100 streamline the auditor's actions since once the particular shelf 100 is located, all or nearly all of the items in the group 134 will be on that shelf.

Not shown in FIG. 10 are records which are preferably maintained indicative of whether or not a particular product has had its price audited. When the auditor finishes a day's work of auditing, the auditor enters information into the system indicative of the results of the audit, and for a particular product if the result is a price match, a record is kept that the product's price has been audited (and perhaps the date of the audit and the price on that day). As often as desired store personnel may thus generate reports intended to show the rate of progress toward a price auditing goal, such as price auditing of every item at least once per year.

It will be appreciated that the information in the lists (for example, lists 133, 134, and 135) of the store computer in the space management system according to the invention permit auditing that is much more sophisticated than a seriatim check of some specified fraction of the store products in each audit. It is a straightforward matter to establish distinct rates of auditing progress for classes of products within the store. For example, one could audit 5% of the recent price increases and 5% of the recent price decreases, drawing upon the above-mentioned stored information as the date and direction of price change for each product. For items that have not had recent price changes, one could increase or decrease the fraction audited so as to come as close as desired to the goal of auditing the prices of every item in the store every year.

In the system according to the invention, store management are able to predetermine the criteria according to which audit lists are prepared, and can adjust the criteria over time. These criteria may be stored in store computer 115 or in management computer 120, or preferably in both. The criteria may be quite sophisticated. For example, the total number of items on the scan list (e.g. 200 items) may be preselected. A limit on the number of days before reuse may be set; if the reuse date is set to 5, then if an item has been audited it would not be reaudited again for at least 5 days. Percentages could be set determining what fraction of labels checked were electronic and what fraction of labels set were paper. Percentages could be set determining what fraction of prices audited were for items directly delivered to the store as distinguished from items provided by the store warehouse. Standards could be set that all price increases (or decreases) are audited no later than a predetermined number of days.

Central store management are able to initiate data transfers over the communication links shown in FIG. 6 to permit comparing the prices in the price lists of the stores 119 with a list of desired prices stored in central computer 120. Likewise, the data transfers permit confirmation that price auditing in each of the stores 119 is proceeding at the desired rate of progress and according to desired criteria.

Figure 11:
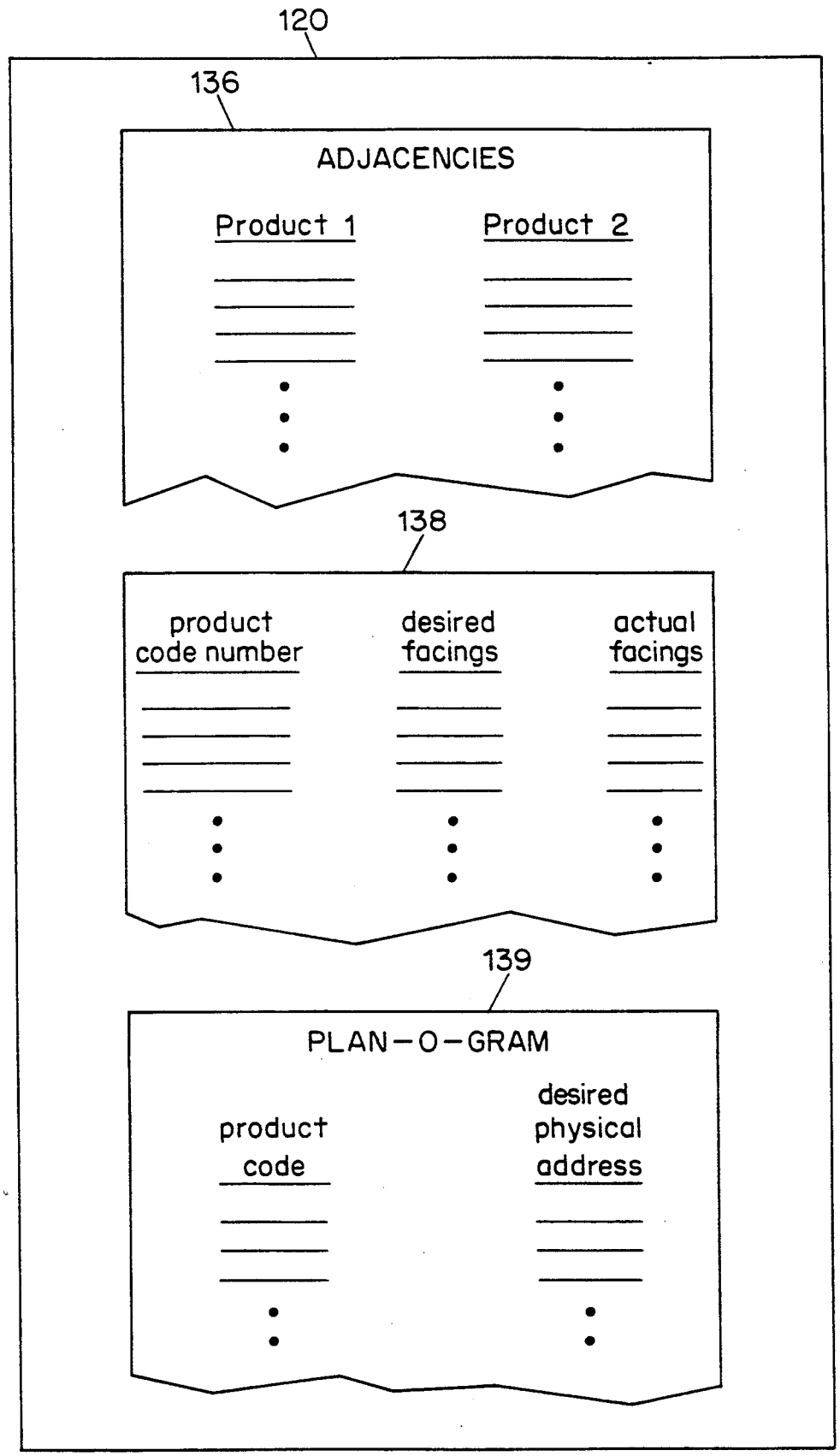
FIG. 11 shows some of the lists maintained typically at central management relating to the shelf set desired for a store.

Turning now to FIG. 11, in the improved space management system according to the invention, adjacency audit lists 136 may also be prepared and stored, representing a portion of the above-mentioned shelf set information. In each entry of such a list 136, the entry will communicate that it is desired for two particular items to be physically adjacent in store shelf display. The auditor is expected to locate the two items and to confirm that they are physically adjacent.

Confirmation of the desired adjacency may be achieved in the system according to the invention by any of several methods, each with an associated level of precision.

As a first method, the label list 134 (see FIG. 10) may be uploaded via communications path 123 (see FIG. 6) and made available to central computer 120 (see FIG. 11). Consider the first entry in the list 136; it includes two product code numbers. The central computer 120 may search list 134 for all the shelf physical addresses at which the first of the product code numbers may be found. (Although the most common result of the search will be a single shelf physical location, it will be appreciated that some items appear at more than one location in the store.) A search is also done for the second of the product code numbers to derive a second list of shelf physical addresses. If the two lists of shelf physical addresses overlap (or if they yield a pair of addresses that are sufficiently close) then the adjacency has been confirmed. While this first method is most applicable to electronic labels, if physical location data have been stored for non-electronic (e.g. paper, plastic) labels, then the method will also confirm adjacency for those labels.

Confirmation of adjacency may also be confirmed by a physical audit. Lists like the lists 132 of FIG. 9 are generated and the auditor goes to the store shelf locations to confirm the adjacencies. As described above in connection with the price auditing, it will be appreciated that the sequence of entries on the adjacency audit list may be optimized to minimize running back and forth and searching within the store for the items on the list.

When either of the above-mentioned methods of confirming adjacency is employed, preferably a record is kept in computer 115 or 120 or both regarding the date on which the method was performed and the pairs of items for which the method was performed. This permits store personnel to monitor the progress toward a goal such as checking all adjacencies at least once per year.

Returning to FIG. 10, in the improved space management system according to the invention, the tedious task of auditing product facings is made much easier, and the danger that exceptions might be overlooked is minimized. It will be recalled from the above discussion in connection with FIG. 2 and the end caps 112 that there will have been a more or less continuous process of the store computer confirming the identities of the labels 103 on a given rail 100. This information, stored for example in a list 134 (FIG. 10), greatly streamlines the facings audit as will now be described.

In performing an audit of product facings, the user is able to use the display hardware, including the push button 107 on each label 103, as a data collection system for product facing information. This eliminates the multiplicity of manual writing, copying, and keying steps in prior art ways of auditing product facings. The user signals to the system the portion of the store in which auditing is to take place, by any of several means.

A first way for a user to signal a store portion is as follows: the user uses an RF-linked scanner wand, or other hand held device (not shown in FIG. 5) to scan or enter by keyboard a particular product bar code. The bar code and associated keyboard entries by the user (indicative of the imminent facings audit) are communicated to the store computer 115. In response thereto, the store computer looks up the product code number (from the bar code) in the list 134 (shown in FIG. 10), to determine its shelf physical address. A search is made to identify all the labels in a physical area associated with that shelf physical address. This is done, preferably, with reference to a list 137 stored in computer 115. Then, the computer 115 sends messages to all the labels 103 located in the physical area directing the labels to display a predetermined alternative display. From the user's point of view, the practical result is a rather dramatic change in the displays—one can of peas is scanned with the scanner or referred to by keyboard entries and the price displays for all the canned vegetables start to blink, or commence to display something other than price (e.g. the desired number of facings, or the amount of stock available in the stockroom).

A second way in which a user signals a store portion may be by inserting a "key" into a rail 100. The "key" is electrically quite similar to a label 103, and its presence is quickly detected by the central computer 115, as is its shelf physical address. Then, much as previously described with respect to the RF-linked scanner, a search is made to identify all the labels in a physical area associated with that shelf physical address. As above, this is preferably done with reference to a list 137 stored in computer 115. Then, the computer 115 sends messages to all the labels 103 located in the physical area directing the labels to display a predetermined alternative display. From the user's point of view, the practical result is a similar change in the displays—a "key" is inserted into a rail 100 holding some of the canned vegetables, and the price displays for all the canned vegetables start to blink, or commence to display something other than price.

Once the labels in a particular portion of the store change from the normal price display mode to a facing audit mode (due to either of the above signaling methods, or due to some other signaling method such as keyboard entry at the computer 115), then the facing audit activity proceeds. In facing audit mode, the user starts at the first label 103 at one end of a shelf and notes the actual number of product facings corresponding to that label. The user then presses the pushbutton 107 on the label 103 repeatedly—once for each observed product facing. The process is repeated for each label 103 along the shelf 101, and for the rest of the shelves 101 in the area being audited.

The button pressings are communicated to the store computer 115 by the above-described communications protocols, and serve to update the contents of list 135 (FIG. 10). Desired numbers of facings, actual numbers of facings, and deviations between the desired and actual numbers of facings, may all be listed on-site for remediation by store personnel, or may be reported to central management via link 123 (FIG. 6) or both. Central management personnel may initiate a cross-check in computer 120 to compare the report from the store 119 with desired facing information from a list 138 stored in computer 120 (see FIG. 11). List 138 contains a second portion of the above-mentioned shelf set information, above and beyond that mentioned above with respect to list 136. For each item in the facings list 138 a check is made to see whether there exists a label in list 135 associated with that item, and if such a label exists, then the actual and desired facings are compared.

Those skilled in the art will readily appreciate that the above-described button-pressing activity provides much more information to the computer 115 than just the number of facings. For example, as mentioned above in connection with FIG. 4 and end caps 112, it may be that the system architecture only provides shelf location resolution to within four feet (the rail 100 associated with one uniquely-addressed end cap 112). The sequence in which labels 103 report their buttons 107 to have been pressed tells the computer 115 the sequence of labels 103 along a given rail 100. This information is preferably stored, for example in list 134 as part of the shelf physical address or as a separate field.

Thus in the improved space management system according to the invention, it is a straightforward matter to collect reliable information about the actual sequence of products on shelves. The information is a byproduct of the facings audit. This information is important to the plan-o-gram audit activity mentioned above. However, in the situation where a product is missing from the shelf (e.g. out of stock) the number of facings could be zero, in which case no pressing of the button for that product is appropriate. Thus, in many store settings it is helpful to have a sequence procedure that is performed separately from the facings audit activity. In the sequence procedure, the user signals to the system the portion of the store in which the collection of sequence information is to take place, such as by the above-mentioned RF-linked scanner, or "key", methods of signaling. As a result the labels in the specified portion of the store change from the normal price display mode to a product sequence mode. In product sequence mode, the user starts at the first label 103 at one end of a shelf 101 and presses the button 107 on the first label 103. The user moves to the second label 103, presses its button 107, moves to the third label 103, and the process is repeated for each label 103 along the shelf 101, and for the rest of the shelves 101 in the area being audited. This permits the system to collect information as to the sequence of labels along a rail.

Plan-o-gram auditing may thus be performed quite efficiently in the system according to the invention. For example, central management personnel may initiate a transfer of list 134 from a store 119 to the computer 120 (see system 122 in FIG. 6), and the contents may be compared with the plan-o-gram of list 139, representing a third portion of the shelf set information, above and beyond that in lists 136 and 138. Exceptions may then be listed, showing deviations between the actual and desired product locations.

Those skilled in the art will appreciate that while item-by-item exception lists showing deviations between desired data (stored for example in computer 120) and actual data (stored for example in computer 115) are helpful, it is also helpful to derive statistical values, such as the percentage compliance for particular stores 119. This is done by comparing the size of the list 139 or 134 with the size of the list of exceptions.

Those skilled in the art will appreciate that the shelf set information here described as contained in lists 136, 138, and 139 of FIG. 11 could just as effectively be stored in a single list or in a greater number of distinct lists than the three discussed herein, without departing in any way from the invention.

In each of the above-described physical audit processes, the auditor reports the exceptions that were found; theoretically there would never be exceptions and in actuality it is hoped there are very few exceptions. In the space management system according to the invention the auditor is able to provide the exceptions by a streamlined data input procedure; if performed at a keyboard, the number of required keystrokes is kept to a minimum. The system according to the invention reduces the incentive for the lazy auditor to incorrectly report that all is well simply to reduce the work burden.

It will be appreciated that those skilled in the art will have no difficulty devising numerous obvious variations of the above- described embodiments, which variations will all fall within the scope of the invention. Thus, the detailed description of the embodiment above should not be understood as limiting the scope of the invention, as defined by the following claims. For example, although the embodiment of the invention is given in the context of a retail store containing items for sale, the invention when properly understood is of extraordinary utility in almost any premises where distinct items are stored and retrieved from shelves, such as a warehouse or storehouse.

I claim:

1. A space management system for use in a premises having items on shelves, the system comprising:
   a first computer;
   shelf set data storage means, said shelf set data storage means disposed to store information regarding a desired set of items and information regarding a desired premises location for each item;
   a plurality of rails disposed on the shelves and communicatively coupled with the first computer;
   a multiplicity of labels disposed on the rails;
   each rail comprising mechanical means for mechanically securing the labels and communication means for providing communication between the first computer and the labels;
   each label comprising a display, a memory, and address-matching means, each label having an address, said address-matching means responsive to a first message communicated from the first computer for determining whether there is a match between address information in the first massage and the address of the label, said address-matching means responsive to the match for generating a response communicated by the communication means to the first computer;
   the first computer comprising label contents list means for storing information indicative, for each label in the premises, of the location of the rail securing the label, and of an item associated with the label; and
   comparing means responsive to an initiating by a user for comparing the information in the label contents list means and the information in the shelf set data storage means to identify information in the shelf set data storage means for which there is no corresponding information in the label contents list means.

2. The space management system of claim 1 wherein the shelf set data storage means and the comparing means comprise a second computer, the second computer remote from the first computer and communicatively coupled thereto.

3. A space management system for use in a premises having items on shelves, the system comprising:
   a first computer;
   adjacency data storage means, said adjacency data storage means disposed to store information regarding identities of first and second items for which adjacent shelf locations are desired;
   a plurality of rails disposed on the shelves and communicatively coupled with the first computer;
   a multiplicity of labels disposed on the rails;
   each rail comprising mechanical means for mechanically securing the labels and communication means for providing communication between the first computer and the labels;
   each label comprising a display, a memory, and address-matching means, each label having an address, said address-matching means responsive to a first message communicated from the first computer for determining whether there is a match between address information in the first message and the address of the label, said address-matching means responsive to the match for generating a response communicated by the communication means to the first computer;
   the first computer comprising label contents list means for storing information indicative, for each label in the premises, of the location of the rail securing the label, and of an item associated with the label; and adjacency-confirmation means responsive to an initiation by a user for selecting an entry in the adjacency data storage means regarding the identities of first and second items for which adjacent shelf locations are desired, for determining whether the information in the label contents list means shows existence of first and second labels associated with the first and second items, and if the first and second labels exist, for determining whether the information indicative of the locations of the rails securing the first and second labels show the first and second labels to be secured to adjacent locations.

4. The space management system of claim 3 wherein the adjacency data storage means and the adjacency-confirmation means comprise a second computer, the second computer remote from the first computer and communicatively coupled thereto.

5. A space management system for use in a premises having items on shelves, the system comprising:

a first computer;

facings list data storage means, said facings list data storage means disposed to store information regarding an identity of a first item for which a particular number of facings are desired;

a plurality of rails disposed on the shelves and communicatively coupled with the first computer;

a multiplicity of labels disposed on the rails;

each rail comprising mechanical means for mechanically securing the labels and communication means for providing communication between the first computer and the labels;

each label comprising a display, a memory, a button, and address-matching and button-response means, each label having an address, said address-matching and button-response means responsive to a first message communicated from the first computer for determining whether there is a match between address information in the first message and the address of the label, said address-matching and button-response means responsive to the match for generating a first response communicated by the communication means to the first computer; said address-matching and button-response means responsive to pressing of the button for generating a second response communicated by the communications means to the first computer;

the first computer comprising label contents list means for storing information indicative, for each label in the premises, of the location of the rail securing the label, and of an item associated with the label; and the first computer further comprising facing data collection means for storing information indicative, for each label in the premises, of a number of times the button for that label has been pressed in a predetermined time interval, said number defined to be indicative of the number of facings of items associated with that label; and comparing means responsive to an initiation by a user for determining whether information in the label contents list data storage means shown an existence of a first label associated with the first item, and if the first label exists, for determining whether the number of times the button for that label has been pressed matches the particular number of facings associated with the first item.

6. The space management system of claim 5 wherein the facings list data storage means and the comparing means comprise a second computer, the second computer remote from the first computer and communicatively coupled thereto.

7. A scan audit management system for use in a premises having items on shelves, the system comprising:

a first computer;

a plurality of rails disposed on the shelves and communicatively coupled with the first computer;

a multiplicity of labels disposed on the rails;

each rail comprising mechanical means for mechanically securing the labels and communication means for providing communication between the first computer and the labels;

each label comprising a display, a memory, and address-matching means, each label having an address, said address-matching means responsive to a first massage communicated from the first computer for determining whether there is a match between address information in the first message and the address of the label, said address-matching means responsive to the match for displaying on the display a price communicated by the communication means from the first computer;

said first computer further comprising label contents storage means for storing records, each record indicative of a corresponding label, each record containing first information indicative of an identity of the corresponding label, second information indicative of the shelf securing the corresponding label, third information indicative of a price value desired to be displayed for the corresponding label;

said first computer further comprising audit list generation means for generating a list of labels selected according to predetermined criteria, said list including the desired price value for each label on the list, the labels on said list grouped according to the second information.

8. The scan audit management system of claim 7 wherein the records in the label contents storage means further comprise fourth information indicative of the corresponding labels having been previously audited;

the audit list generation means further comprising means or changing said fourth information for the records corresponding to the labels.

9. The scan audit management system of claim 7 wherein the predetermined criteria for selecting labels comprise a criterion of the price value having changed in a direction for one of the selected labels.

10. The scan audit management system of claim 9 wherein the direction of the price value having changed is upward.

11. The scan audit management system of claim 9 wherein the direction of the price value having changed is downward.

12. A space management system or use in a premises having items on shelves, the system comprising:

a first computer;

a plurality of rails disposed on the shelves and communicatively coupled with the first computer;

a multiplicity of labels disposed on the rails;

each rail comprising mechanical means for mechanically securing the labels and communication means for providing communication between the first computer and the labels, each rail having a unique address;

each label comprising a display, a memory, a button, and address-matching and button-response means, each label having an address, said address-matching and button-response means responsive to a first message communicated from the first computer for determining whether there is a match between address information the first massage and the address of the label, said address-matching and button-response means responsive to the match for generating a first response communicated by the communication means to the first computer; said address-matching and button-response means responsive to pressing of the button for generating a second response containing the address of the label, said second response communicated by the communications means to the first computer;

said communication means further comprising appender means for appending to said second response information indicative of the unique address of the rail securing the label generating said second response;

the first computer comprising a data collection means for storing, for a sequence of received second responses, information indicative of the address of the label generating each second response.

13. The space management system of claim 12 in which:

the space management system further comprises adjacency data storage means, said adjacency data storage means disposed to store information regarding identifies of first and second items for which adjacent shelf locations are desired;

said data collection means further comprises means storing records associating each label with an item; and the space management system further comprises adjacency-confirmation means responsive to an initiation by a user for selecting an entry in the adjacency data storage means regarding the identities of first and second items for which adjacent shelf locations are desired, for determining whether information in the data collection means shows the existence of first and second labels associated with the first and second items, and if the first and second labels exist, for determining whether the information stored for a sequence of received second responses show the first and second labels to have generated consecutive second responses.

14. A method for use in a space management system, the system comprising a computer, a plurality of rails disposed on shelves and communicatively coupled with the computer, communication means, and electronic price display labels, each label comprising a display, a memory, and address-matching means, each label having an address, said address-matching means responsive to a first message communicated from the computer for determining whether there is a match between address information in the first message and the address of the label, said address-matching means responsive to the match for generating a response communicated by the communication means to the computer; each rail comprising mechanical means for mechanically securing the labels; the computer comprising a storage means for storing automatically updated information including a first list of said electronic price display labels and a respective address for each electronic display label, a second list of prices desired to be displayed on respective labels, a third list of plain-English descriptions for products associated with the respective labels, and a fourth list indicative of previous dates on which the prices of the respective labels were audited; said method comprising the steps of:

selecting a physically contiguous area within a premises;

preparing a list of electronic price display labels located within the physically contiguous area;

printing the plain-English descriptors and the desired prices for the labels on the list, whereby the items on a particular list are physically contiguous; and updating the fourth list for at least one of the labels on the list.

15. A method for use in a space management system, the system having a first list of electronic price display labels and respective products and shelf locations for the labels, and a second list of adjacency entries, each entry indicating a first product and a second product desired to be adjacent, the system also comprising a computer, a plurality of rails disposed on the shelves and communicatively coupled with the computer, communications means, and electronic price display labels, each label comprising a display, a memory, and address-matching means, each label having an address, said address-matching means responsive to a first message communicated from the computer for determining whether there is a match between address information in the first message and the address of the label, said address-matching means responsive to the match for generating a response communicated by the communication means to the computer; each rail comprising mechanical means for mechanically securing the labels; said communication means further comprising appender means for appending to said response an appended message indicative of the location of the rail securing the label generating said response; the method comprising the steps of:

for substantially all of the labels, sending from the computer to the label a respective first message, receiving from the label a respective response, receiving from the appender means a respective appended message, and storing to the first list a respective shelf location derived from the appended message;

selecting an entry from the second list;

for the first product indicate in the entry, finding a record in the first list corresponding to the first product, and extracting from the record a first product shelf location;

for the second product indicated in the entry, finding a record in the first list corresponding to the second product, and extracting from the record a second product shelf location; and comparing the first and second product shelf locations;

thereby establishing whether, for the first and second products, there exist corresponding labels that are secured to adjacent shelf locations.

16. A method for use in a space management system, the system comprising a computer, a first list of products and respective desired numbers of facings of the products, a second list of labels and respective products associated with the labels and actual numbers of respective facings of the products, a multiplicity of labels, communication means for providing communication between the computer and the labels, each label comprising a display, a memory, a button, and address-matching and button-response means, each label having an address, said address-matching and button-response means responsive to a first message communicated from the computer for determining whether there is a match between address information in the first message and the address of the label, said address-matching and button-response means responsive to the match for generating a response communicated by the communication means to the computer; said address-matching and button-response means responsive to pressing of the button for generating a second response communicated by the communications means to the computer; the method comprising the steps of:

pressing the button on a label a number of times indicative of the number of facings of product associated with that label;

receiving information indicative of the number of times the button was pressed in the preceding step and storing said information to a corresponding entry of the second list; and comparing, for a corresponding pair of entries in the first and second lists, the desired and actual numbers of facings.

17. A method for use in a space management system, the system comprising a computer, a multiplicity of labels communicatively coupled with the computer and mechanically secured in a sequence, each label comprising a display, a memory, a button, and address-matching means, each label having an address, said address-matching means responsive to a message communicated from the first computer for determining whether the button has been pressed for a label, said address-matching means responsive to pressing of the button for generating a second response containing the address of the label for which the button has been pressed, said second response communicated to the computer, the method comprising the steps of:

pressing the button of a first of the labels in sequence;

receiving from the first of the labels a resist respective second response at the computer;

storing information indicative of the address of the first label generating the respective second response;

pressing the button of the next of the labels in sequence;

receiving from the next of the labels a next respective second response at the computer; and storing information indicative of the address of the label generating the next respective second response, and storing an item of information indicative of the sequence, relative to the first respective second response, in which the next respective second response was received.

18. The method of claim 17 wherein the space management system further comprises an adjacency list of entries, each entry indicating a first product and a second product for which adjacent shelf locations are desired the method further comprising the step of:

selecting an entry from the adjacency list;

for the first and second products in the entry, finding the items of stored information corresponding thereto;

and determining whether the items of stored information were received in sequence.

19. A method for use in a space management system, the system comprising a computer, a shelf set list of entries, each entry comprising information regarding a product and a desired respective location for the product, a plurality of rails communicatively coupled with the computer, a multiplicity of labels disposed on the rails, each label comprising a display, a memory, and address-matching means, each label having an address, said address-matching means responsive to a first message communicated from the computer for determining whether there is a match between address information in the first message and the address of the label, said address-matching means responsive to the match for generating a response communicated to the computer, a location list of records, each record containing information regarding a particular one of the labels and a respective product and a respective rail location for the particular one of the labels, each rail having a unique address and comprising means for appending to responses an appended message indicative of the unique address, the steps of:

for substantially all of the labels, sending from the computer to the label a respective first message, receiving from the label a respective response, receiving from the rail a respective appended message, and storing to the location list a respective rail location derived from the respective appended message;

selecting an entry from the shelf set list;

for the product in the entry, finding a record in the location list corresponding to the product, and extracting from the record the corresponding rail location; and comparing the corresponding rail location and the desired respective location in the entry;

thereby determining whether the label for the product is in the desired respective location for the product.

* * * * *